United States Patent
Xiang et al.

(10) Patent No.: US 11,611,816 B2
(45) Date of Patent: Mar. 21, 2023

(54) SERVICE DATA PROCESSING METHOD AND DEVICE

(71) Applicant: HUAWEI TECHNOLOGIES CO., LTD., Shenzhen (CN)

(72) Inventors: Junling Xiang, Shenzhen (CN); Hong Yang, Dongguan (CN); Tianhai Chang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/333,177

(22) Filed: May 28, 2021

(65) Prior Publication Data
US 2021/0289273 A1    Sep. 16, 2021

Related U.S. Application Data

(63) Continuation of application No. PCT/CN2019/118901, filed on Nov. 15, 2019.

(30) Foreign Application Priority Data

Nov. 30, 2018 (CN) .......................... 201811453170.X

(51) Int. Cl.
*H04J 14/00* (2006.01)
*H04Q 11/00* (2006.01)
*H04B 10/27* (2013.01)

(52) U.S. Cl.
CPC ......... *H04Q 11/0062* (2013.01); *H04B 10/27* (2013.01); *H04Q 2011/0081* (2013.01)

(58) Field of Classification Search
CPC ........ H04Q 11/0062; H04Q 2011/0081; H04B 10/27
See application file for complete search history.

(56) References Cited

U.S. PATENT DOCUMENTS 10,135,760 B2    11/2018    Gareau
2007/0064707 A1    3/2007    Pandel et al.
(Continued)

FOREIGN PATENT DOCUMENTS

CA    3025571 A1 * 11/2017 ............ H04J 14/02
CN    101030891 A    9/2007
(Continued)

OTHER PUBLICATIONS

G.709.1/Y.1331.1, "ITU-T G.709 Flexible OTN short-reach interfaces", ITU-T, Jun. 2018, Section 10 (Year: 2018).*
(Continued)

*Primary Examiner* — Pranesh K Barua
(74) *Attorney, Agent, or Firm* — Rimon PC

(57) ABSTRACT

This application discloses a service data processing method and device. A transmit-end device may generate an optical transport network (OTN) encapsulated signal carrying service data, and generate at least n FlexO (flexible optical transport network) frames based on the OTN encapsulated signal and send the at least n FlexO frames, where r FlexO frames in the at least n FlexO frames carry service check data, and the service check data may be used to restore the service data when bit error rates of k FlexO frames are greater than a reference bit error rate. In this way, if no more than r physical ports included in a FlexO group interface fail, or a bit error rate of no more than r FlexO frames is greater than the reference bit error rate due to another reason, a receive-end device may restore the service data through a received FlexO frame.

19 Claims, 5 Drawing Sheets

(56) References Cited

U.S. PATENT DOCUMENTS

2010/0002592 A1    1/2010   Effenberger et al.
2018/0102834 A1    4/2018   Ibach et al.

FOREIGN PATENT DOCUMENTS

| CN | 101035112 A | 9/2007 |
| CN | 1791057 B | 6/2011 |
| CN | 108111219 A | 6/2018 |
| CN | 108513180 A | 9/2018 |
| CN | 108809674 A | 11/2018 |
| WO | 2017201757 A1 | 11/2017 |

OTHER PUBLICATIONS

Steve Gorshe, "Beyond 100g OTN Interface Standardization", Microsemi, p. 41-55, Mar. 2017 (Year: 2017).*

Gorshe Steve: Beyond 100G OTN standardization, 2017 Optical Fiber Communications Conference and Exhibition (OFC), OSA,Mar. 2017, 62 pages.

Liu Yu-jie et al, "Progress and key technologies of OTN", Optical communication technology, 6th Issue, Jul. 10, 2009, total 3 pages. With an English Abstract.

Steven S. Gorshe et al, "OTN Interface Standards for Rates Beyond 100 Gb/s", Journal of Lightwave Technology, vol. 36, No. 1, Jan. 1, 2018, total 8 pages.

* cited by examiner

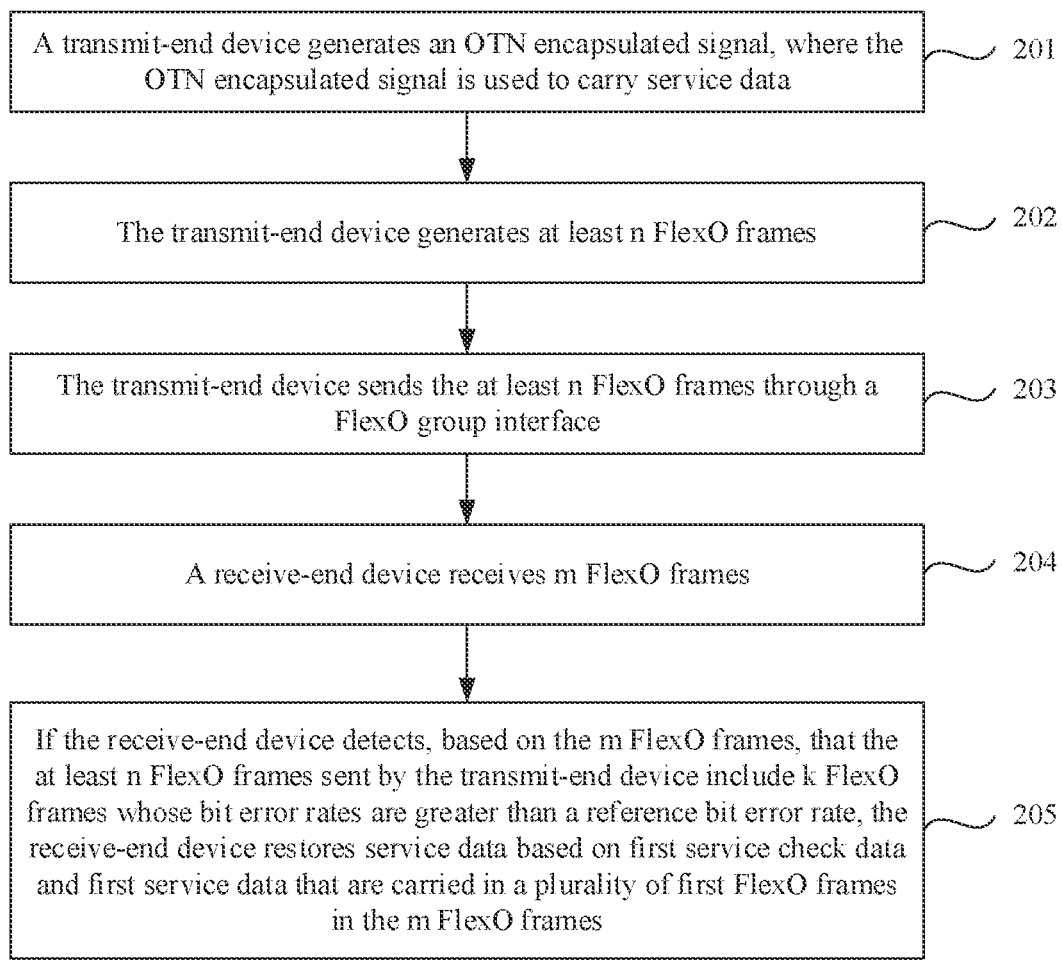

SERVICE DATA PROCESSING METHOD AND DEVICE

CROSS-REFERENCE TO RELATED APPLICATIONS

This application is a continuation of International Application No. PCT/CN2019/118901, filed on Nov. 15, 2019, which claims priority to Chinese Patent Application No. 201811453170.X, filed on Nov. 30, 2018. The disclosures of the aforementioned applications are hereby incorporated by reference in their entireties.

TECHNICAL FIELD

This application relates to the field of communications technologies, and in particular, to a service data processing method and device.

BACKGROUND

With a growth of service traffic, a fixed-rate interface provided by an optical transport network (OTN) can no longer meet an interconnection requirement. In response, the industry proposes a flexible optical transport network (FlexO) group interface. Through the group interface, an OTN device transmits an optical transport unit Cn (OTUCn) signal carrying service data. The FlexO group interface may include a plurality of physical ports. The OTN device modulates the OTUCn signal onto a plurality of optical carriers to form a plurality of optical carriers carrying the OTUCn, and transmits the plurality of optical carriers by using the plurality of physical ports included in the FlexO group interface.

If one of a plurality of physical ports that are in a FlexO group interface and that are configured to carry service data of a service fails, a receive-end device would determine that the entire FlexO group interface has failed and an OTUCn signal transmitted by the group interface cannot be recovered.

SUMMARY

This application provides a service data processing method and device, to implement lossless restoration of service data transmitted by a plurality of physical ports in a FlexO group interface. The technical solutions are as follows.

According to a first aspect, a service data processing method is provided. The method includes: generating an optical transport network OTN encapsulated signal, where the OTN encapsulated signal is used to carry service data, and the OTN encapsulated signal is a signal obtained by encapsulating the service data in an OTN data packet encapsulation format; generating at least n FlexO frames, where the at least n FlexO frames are used to carry the OTN encapsulated signal, the at least n FlexO frames include r FlexO check frames and a plurality of FlexO data frames, the plurality of FlexO data frames carry the service data, the r FlexO check frames carry service check data, the service check data is used to restore the service data when bit error rates of k FlexO frames are greater than a reference bit error rate, k is a positive integer not greater than r, and r is a positive integer not greater than n; and sending the at least n FlexO frames through a flexible optical transport network FlexO group interface. The OTN encapsulated signal may be an OTUXn signal, a flexible optical data unit (ODUflex) signal, a flexible optical service unit (OSUflex) signal, or the like.

In some embodiments of this application, a transmit-end device may generate the OTN encapsulated signal carrying the service data, and generate the at least n FlexO frames based on the OTN encapsulated signal, where r FlexO frames in the at least n FlexO frames carry the service check data, and the service check data may be used to restore the service data when the bit error rates of the k FlexO frames are greater than the reference bit error rate. Then the transmit-end device may send the at least n FlexO frames through the FlexO group interface. In this way, when a bit error rate of not more than r FlexO frames is greater than the reference bit error rate because not more than r physical ports in physical ports included in the FlexO group interface fail or due to another reason, a receive-end device may restore the service data by using a received FlexO frame. This implements lossless restoration of the service data when a part of a plurality of physical ports in the FlexO group interface fail.

When the OTN encapsulated signal is an OTUXn signal, the generating at least n FlexO frames may include three implementations.

In a first implementation, the OTUXn signal includes n OTUX frames, the n OTUX frames include n−r OTUX data frames and r OTUX check frames, and each of the n−r OTUX data frames and the r OTUX check frames includes w slots. In this case, a process of generating the OTUXn signal may include: performing redundancy coding on the $t^{th}$ slot of the n−r OTUX data frames to obtain corresponding check data, where the check data is placed in the $t^{th}$ slot of the OTUX check frames, and t is any positive integer within (0, w−1). Correspondingly, a process of generating the at least n FlexO frames may be: generating the r FlexO check frames based on the r OTUX check frames, generating n−r FlexO data frames based on the n−r OTUX data frames, and using the r FlexO check frames and the n−r FlexO data frames as n FlexO frames. In other words, the at least n FlexO frames are the n FlexO frames.

In this implementation, each OTUX check frame or each FlexO check frame includes slot indication information. The slot indication information is used to indicate whether a corresponding slot is a check slot. The check slot is a slot in which check data is placed.

In a second implementation, an implementation process of the generating at least n FlexO frames may be: obtaining n OTUX data frames based on the OTUXn signal, where the n OTUX data frames carry the service data; performing redundancy coding based on the n OTUX data frames to obtain r OTUX check frames, where the r OTUX check frames carry the service check data; and generating n FlexO data frames based on the n OTUX data frames, generating the r FlexO check frames based on the r OTUX check frames, and using the n FlexO data frames and the r FlexO check frames as n+r FlexO frames.

In this implementation, before mapping to the FlexO frames is performed based on the OTUX data frames, redundancy coding is performed on the OTUX data frames to obtain the OTUX check frames, and then the OTUX data frames and the OTUX check frames are mapped to the FlexO frames.

In a third implementation, an implementation process of the generating at least n FlexO frames may be: obtaining n OTUX data frames based on the OTUXn signal, where the n OTUX data frames carry the service data; and generating n FlexO data frames based on the n OTUX data frames, performing redundancy coding based on the n FlexO data frames to obtain the r FlexO check frames, and using the n FlexO data frames and the r FlexO check frames as n+r FlexO frames.

In some embodiments of this application, considering that a port rate of the FlexO group interface may be less than a signal rate of the OTUX signal, one FlexO frame may need to be split into two parts for sending. Therefore, after the OTUX data frames are mapped to the FlexO frames, redundancy coding is performed to obtain the FlexO check frames.

It should be noted that, in the second implementation and the third implementation, each OTUX check frame or each FlexO check frame includes a first overhead, each OTUX data frame or each FlexO data frame includes a second overhead, the first overhead and the second overhead each include a frame alignment FA byte and an MSI overhead, the MSI overhead included in the first overhead includes frame indication information used to indicate that a corresponding frame is a check frame, and the first overhead is used to carry information obtained by checking information in the second overhead other than the FA byte and the MSI overhead.

Optionally, the first overhead and the second overhead each include an in-line monitoring indication code. The in-line monitoring indication code is used to indicate whether a bit error rate of a corresponding frame is greater than the reference bit error rate.

Optionally, the first overhead or the second overhead further includes port switching indication information. The port switching indication information is used to indicate to: start counting from a currently sent OTUXn signal, and after i OTUXn signals are sent, send a FlexO frame through the FlexO group interface to which h physical ports have been added. Alternatively, the port switching indication information is used to indicate to: start counting from a currently sent OTUXn signal, and after i OTUXn signals are sent, remove h physical ports in a plurality of physical ports included in the FlexO group interface, and send a FlexO frame through the FlexO group interface in which the ports have been removed.

In some embodiments of this application, port switching indication information is carried in an OTUX frame or a FlexO frame, so that the receive-end device may be instructed to add or remove a port based on the port switching indication information, thereby increasing or decreasing, in a lossless manner, a quantity of physical ports in the FlexO group interface.

Optionally, an implementation process of the sending the at least n FlexO frames through a flexible optical transport network FlexO group interface may be: sending each of the at least n FlexO frames through at least two physical ports in a plurality of physical ports bound to the FlexO group interface; or sending at least two FlexO frames in the at least n FlexO frames by using each of a plurality of physical ports included in the FlexO group interface.

Optionally, in the foregoing three implementations, the performing redundancy coding means performing coding by using any one of a Reed-Solomon RS type erasure code, a low-density erasure code, an array code, a digital fountain code, a regenerating code based on network coding, and a local check code.

According to a second aspect, a service data processing method is provided. The method includes: receiving m FlexO frames through a flexible optical transport network FlexO group interface, where the m FlexO frames are at least n FlexO frames sent by a transmit-end device or a part of the at least n FlexO frames, the at least n FlexO frames include r FlexO check frames and a plurality of FlexO data frames, the r FlexO check frames carry service check data, and the plurality of FlexO data frames carry service data; and if it is detected, based on the m FlexO frames, that the at least n FlexO frames sent by the transmit-end device include k FlexO frames whose bit error rates are greater than a reference bit error rate, restoring the service data based on first service check data and first service data that are carried in a plurality of first FlexO frames in the in FlexO frames, where the plurality of first FlexO frames are FlexO frames whose bit error rates are not greater than the reference bit error rate, the first service data is a part of the service data, and k is a positive integer not greater than r.

In an example embodiment of this application, a receive-end device may receive the in FlexO frames, restore the k FlexO frames in the at least n FlexO frames sent by the transmit-end device, and further restore the service data. This implements lossless restoration of the service data when a part of a plurality of physical ports in the FlexO group interface fail.

Optionally, an implementation process of the restoring the service data based on first service check data and first service data that are carried in a plurality of first FlexO frames in the in FlexO frames may be: performing demapping on each of the in FlexO frames to obtain m OTUX frames that are in a one-to-one correspondence with the M FlexO frames; restoring OTUX frames corresponding to the k FlexO frames in the at least n FlexO frames based on first service check data and first service data that are carried in a plurality of first OTUX frames that are in the m OTUX frames and that are in a one-to-one correspondence with the plurality of first FlexO frames, where the k FlexO frames are FlexO frames that are in the at least n FlexO frames and whose bit error rates are greater than the reference bit error rate; and restoring the service data based on the first service data carried in the plurality of first OTUX frames and second service data carried in the restored OTUX frames corresponding to the k FlexO frames.

If the transmit-end device obtains a FlexO check frame through mapping based on an OTUX check frame, the receive-end device may restore the service data based on the plurality of first FlexO frames in the m FlexO frames according to this implementation.

Optionally, each of the m OTUX frames includes an OTUX overhead, and the OTUX overhead of each OTUX frame includes a frame alignment FA byte and a multiplex structure identifier MSI overhead.

An implementation process of the restoring OTUX frames corresponding to the k FlexO frames in the at least n FlexO frames based on first service check data and first service data that are carried in a plurality of first OTUX frames that are in the m OTUX frames and that are in a one-to-one correspondence with the plurality of first FlexO frames may be: aligning the m OTUX frames based on the FA byte in the OTUX overhead of each of the m OTUX frames; determining that an OTUX frame that is in the plurality of first OTUX frames and whose MSI overhead includes frame indication information is an OTUX check frame, and determining that a remaining OTUX frame in the plurality of first OTUX frames is an OTUX data frame; restoring OTUX overheads of the OTUX frames corresponding to the k FlexO frames based on information in an OTUX overhead of the OTUX check frame other than the FA byte and the MSI overhead, and information in an OTUX overhead of the OTUX data frame other than the FA byte and the MSI overhead; restoring service data in the OTUX frames corresponding to the k FlexO frames based on first service data carried in the OTUX data frame and first service check data carried in the OTUX check frame; and obtaining the OTUX frames corresponding to the k FlexO frames based on the restored OTUX overheads of the OTUX frames corresponding to the k FlexO frames and the restored service data in the OTUX frames corresponding to the k FlexO frames.

Optionally, each of them FlexO frames includes an in-line monitoring indication code. The in-line monitoring indication code is used to indicate whether a bit error rate of a corresponding FlexO frame is greater than the reference bit error rate.

The method further includes: determining, based on a plurality of FlexO frames that are received through a plurality of physical ports in the FlexO group interface before the m FlexO frames are received, a reference code of a FlexO frame previously received by using each of the plurality of physical ports; and determining, based on the reference code of the FlexO frame previously received by using each of the plurality of physical ports and the in-line monitoring indication code carried in each of the m FlexO frames, whether the at least n FlexO frames include k FlexO frames whose bit error rates are greater than the reference bit error rate.

The in-line monitoring indication code may be carried in a frame overhead of a FlexO frame, or may be carried in an OTUX overhead of an OTUX frame corresponding to a FlexO frame.

Optionally, the method further includes: when an OTUX overhead of any one of the m OTUX frames includes port switching indication information, based on the port switching indication information, starting counting from a currently received OTUXn signal, and after an OTUXn signal is received, receiving a FlexO frame sent through the FlexO group interface to which h physical ports have been added, or receiving a FlexO frame sent through the FlexO group interface in which h physical ports have been removed.

In an embodiment of this application, the receive-end device may perform port switching by using port switching indication information carried in an OTUX frame, thereby increasing or decreasing, in a lossless manner, a quantity of physical ports in the FlexO group interface.

According to a third aspect, a service data processing apparatus is provided. The service data processing apparatus has a function of implementing the steps in the service data processing method in the first aspect or the second aspect. The service data processing apparatus includes at least one module, and the at least one module is configured to implement the service data processing method provided in the first aspect or the second aspect.

According to a fourth aspect, a service data processing device is provided. A structure of the service data processing apparatus includes a processor and a memory. The memory is configured to store a program that supports the service data processing apparatus in performing the service data processing method provided in the first aspect or the second aspect, and store data used for implementing the service data processing method provided in the first aspect or the second aspect. The processor is configured to execute the program stored in the memory. The storage device operation apparatus may further include a communications bus. The communications bus is configured to establish a connection between the processor and the memory.

According to a fifth aspect, a computer-readable storage medium is provided. The computer-readable storage medium stores an instruction. When the instruction runs on a computer, the computer is enabled to perform the service data processing method in the first aspect or the second aspect.

According to a sixth aspect, a computer program product including an instruction is provided. When the computer program product runs on a computer, the computer is enabled to perform the service data processing method in the first aspect or the second aspect.

Technical effects achieved by the third aspect, the fourth aspect, the fifth aspect, and the sixth aspect are similar to those achieved by corresponding technical means in the first aspect and the second aspect. Details are not described herein again.

Benefits of the technical solutions provided in this application at least include: in the embodiments of this application, the OTN encapsulated signal carrying the service data may be generated, and the at least n FlexO frames are generated based on the OTN encapsulated signal, where the r FlexO frames in the at least n FlexO frames carry the service check data, and the service check data may be used to restore the service data when the bit error rates of the k FlexO frames are greater than the reference bit error rate. Then the transmit-end device may send the at least n FlexO frames through the FlexO group interface. In this way, when a bit error rate of not more than r FlexO frames is greater than the reference bit error rate because not more than r physical ports in physical ports included in the FlexO group interface fail or due to another reason, the receive-end device may restore the service data by using a received FlexO frame. This implements lossless restoration of the service data transmitted through a plurality of physical ports in the FlexO group interface.

BRIEF DESCRIPTION OF DRAWINGS

FIG. 1 is a diagram of an implementation environment for a service data processing method according to an embodiment of this application;

FIG. 2 is a flowchart of a service data processing method according to an embodiment of this application;

DESCRIPTION OF EMBODIMENTS

Figure 3:
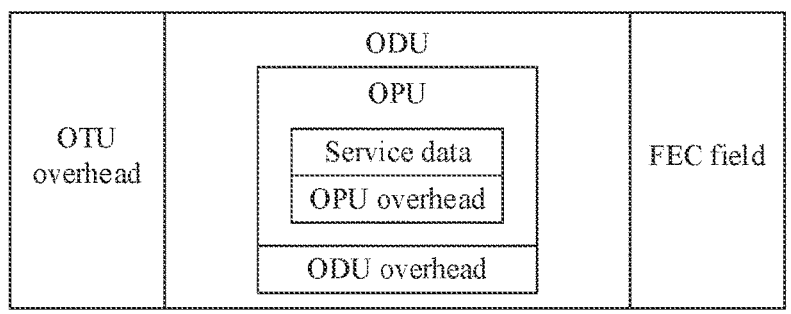
FIG. 3 is a schematic diagram of a frame structure of an OTUX frame according to an embodiment of this application.

To make the objectives, technical solutions, and advantages of this application clearer, the following further describes the implementations of this application in detail with reference to the accompanying drawings.

An application scenario of the embodiments of this application is described before the embodiments of this application are described in detail.

With a growth of service traffic, a fixed-rate interface provided by an OTN can no longer meet an interconnection requirement. In response, the industry proposes N×100 G, N×200 G, and N×400 G FlexO group interfaces for carrying OTUCn signals, to implement inter-domain interface interconnection for OTUCn signals. A FlexO group interface may include a plurality of physical ports. An N×100 G FlexO group interface means that a plurality of physical ports included in the FlexO group interface are all 100 G. An N×200 G FlexO group interface means that a plurality of physical ports included in the FlexO group interface are all 200 G, and so on. In addition, C in an OTUCn signal means 100 Gbps. When an OTUCn signal is transmitted, if a FlexO group interface is an N×100 G group interface, the OTUCn signal may be split to obtain n OTUC frames, and one OTUC frame is transmitted by using each of n physical ports in the FlexO group interface. However, if a FlexO group interface is an N×200 G group interface, when an OTUCn signal is transmitted, two OTUC frames may be sent by using each physical port. It can be learned that a quantity of ports in a FlexO group interface may be correspondingly adjusted along with a specific rate of an OTUCn signal, so that the FlexO group interface can satisfy inter-domain interface flexibility, and network construction costs can also be greatly reduced.

In a process of transmitting an OTUCn signal through a FlexO group interface, one of a plurality of physical ports included in the FlexO group interface may fail. In this case, considering that the OTUCn signal is implemented as a whole, to avoid a failure of the OTUCn signal due to the failure of a specific physical port, this application provides a service data processing method for a transmit-end device to send an OTUCn signal and a receive-end device to restore the OTUCn signal, to implement lossless restoration of service data when some physical ports in a FlexO group interface fail.

FIG. 1 is a diagram of an implementation environment for a service data processing method according to an embodiment of this application. As shown in FIG. 1, the implementation environment includes a transmit-end device 101 and a receive-end device 102. The transmit-end device 101 and the receive-end device 102 are connected to each other by using an OTN.

For example, the transmit-end device 101 may receive service data sent by a customer device, or the transmit-end device 101 may generate service data, process the service data by using the service data processing method provided in the embodiments of this application, and send, through a FlexO group interface, a data frame that is obtained through processing and that carries the service data and service check data.

The receive-end device 102 may receive the data frame that is sent by the transmit-end device 101 through the FlexO group interface and that carries the service data and the service check data, and process a received FlexO frame by using the service data processing method provided in the embodiments of this application, to implement lossless restoration of the service data.

It should be noted that either e transmit-end device 101 or the receive-end device 102 may be a router, a switch, an OTN transmission device, or the like. This is not specifically limited in this embodiment of this application. FIG. 2 shows a service data processing method according to an embodiment of this application. Referring to FIG. 2, the method includes the following steps.

Step 201: A transmit-end device generates an OTN encapsulated signal, where the OTN encapsulated signal is used to carry service data.

It should be noted that, in an embodiment of this application, different OTN encapsulated signals are generated depending on different encapsulation formats used by the transmit-end device for encapsulating the service data. The OTN encapsulated signal may be any one of an OTUXn signal, an ODUflex signal, or an OSUflex signal.

In an embodiment of this application, after receiving the service data sent by a customer device or generating the service data, the transmit-end device may map the service data to an OTUXn structure to generate an OTUXn signal. X in OTUXn may be 25, 50, 100, 200, 400, or the like. This is not specifically limited in this embodiment of this application. When X is 25, each of n OTUX frames included in the OTUXn signal has a rate of 25 Gbps. If X is 50, each of the n OTUX frames included in the OTUXn signal has a rate of 50 Gbps, and so on.

For example, FIG. 3 is a schematic diagram of a frame structure of an OTUX frame. As shown in FIG. 3, the OTUX frame includes an optical data unit (optical data unit, ODU), an OTU forward error correction (FEC) field, and an OTU overhead. The ODU includes optical payload unit (OPU) information and an ODU overhead. The OPU information includes service data, an OPU overhead used to support transmission of the service data, and the like. It should be noted that the OTU overhead may include a frame alignment (FA) byte, and the OTU overhead and the ODU overhead each include a reserved overhead. It should be noted that the FEC field is optional.

In an embodiment of this application, the transmit-end device may map the service data to the OTUXn structure in two different manners, to generate the OTUXn signal.

In a first implementation, each of n OTUX frames included in the OTUXn structure may include w slots. The transmit-end device may sequentially map the service data to slats of n–r OTUX frames, to obtain n–r OTUX data frames. Then the transmit-end device may perform redundancy coding on the $t^{th}$ slat of the n–r OTUX data frames to obtain check data corresponding to the $t^{th}$ slot, and map, to the $t^{th}$ slot of remaining r OTUX frames, the check data corresponding to the $t^{th}$ slot, to obtain r OTUX check frames. In other words, the OTUXn signal generated in this implementation includes the n–r OTUX data frames and the r OTUX check frames. t is any positive integer within (0, w−1).

It should be noted that a value of r may be equal to a quantity of OTUX data frames that can be recovered. Depending on different values of r, the transmit-end device may place, in the r OTUX check frames in different manners, check data obtained by performing redundancy coding on service data in a slot.

For example, when r=1, the transmit-end device may perform redundancy coding based on data in the $t^{th}$ slot of n−1 OTUX data frames to generate one piece of check data, and place the generated check data in a $t^{th}$ slot of an OTUX check frame. When r=2, the transmit-end device may generate two pieces of check data based on data in the $t^{th}$ slot of n−2 OTUX data frames, correspondingly place a first piece of check data of the two pieces of check data in a $t^{th}$ slot of a first OTUX check frame, and correspondingly place a second piece of check data of the two pieces of check data in a $t^{th}$ slot of a second OTUX check frame. Two pieces of check data subsequently generated for any slot are correspondingly placed in slots of corresponding check frames according to this sequence. For a case in which r is equal to 3, 4, or another value, processing may be performed with reference to the case in which r is equal to 2.

In this implementation, the transmit-end device may perform redundancy coding on all slots of the n−r OTUX data frames. Certainly, the transmit-end device may alternatively perform redundancy coding on some slots of the n−r OTUX data frames, to recover a part of service data in the OTUX data frames. When redundancy coding is performed on some slots of the n−r OTUX data frames, some slots of an OTUX check frame are idle. In this case, the idle slots of the OTUX check frame may be used to carry service data. It should be noted that, in the embodiments of this application, a purpose of performing redundancy coding is to recover data. The foregoing check frame is used to carry coded data obtained through redundancy coding. The frame may also be referred to as a coded frame, a recovery frame, or another name. This is not limited in this application.

In a second implementation, the transmit-end device may map the service data to n OTUX frames to obtain an OTUXn signal including n OTUX data frames. Different from the first implementation, the second implementation does not include a redundancy coding step. The step is performed in subsequent steps.

Optionally, after generating or receiving the service data, the transmit-end device max alternatively directly map the service data to an ODU structure to generate an ODUflex signal, or the transmit-end device may directly map the service data to an OSU structure to generate an OSUflex signal.

The following steps are described by using an example in which the OTN encapsulated signal is an OTUXn signal. For a case in which the OTN encapsulated signal is an ODUflex signal or an OSUflex signal, the transmit-end device may perform processing with reference to a subsequent method for processing the OTUXn signal.

Step 202: The transmit-end device generates at least n FlexO frames.

Specifically, the transmit-end device may generate the at least n FlexO frames based on the foregoing OTUXn signal. It should be noted that the at least n FlexO frames include r FlexO check frames and a plurality of FlexO data frames. The plurality of FlexO data frames carry the service data. The FlexO check frame may also be referred to as a FlexO redundancy frame or a FlexO recovery frame, and the r FlexO check frames carry service check data. The service check data is generated based on the service data, and is used to restore redundancy data of the service data when bit error rates of k FlexO frames are greater than a reference bit error rate. k is a positive integer not greater than r. r is a positive integer not greater than n. The reference bit error rate is a minimum bit error rate at which a FlexO frame cannot be corrected by using an error-correcting code. In other words, when a bit error rate of a FlexO frame exceeds the reference bit error rate, the FlexO frame cannot be corrected by using an error-correcting code. For example, the reference bit error rate may be, $7\times10^{-4}$, $6\times10^{-3}$, or another value.

It should be noted that, in some of the embodiments of this application, the at least n FlexO frames may be generated in different manners depending on different manners of generating the OTUXn signal.

If the OTUXn signal is generated according to the first implementation in step 201, after generating the OTUXn signal, the transmit-end device may map, to n−r FlexO data frames, the n−r OTUX data frames carrying the service data; and map, to r FlexO check frames, the r OTUX check frames carrying check data of each slot. In this case, the at least n FlexO frames generated based on the OTUXn signal are n FlexO frames including the n−r FlexO data frames and the r FlexO check frames.

Figure 4:
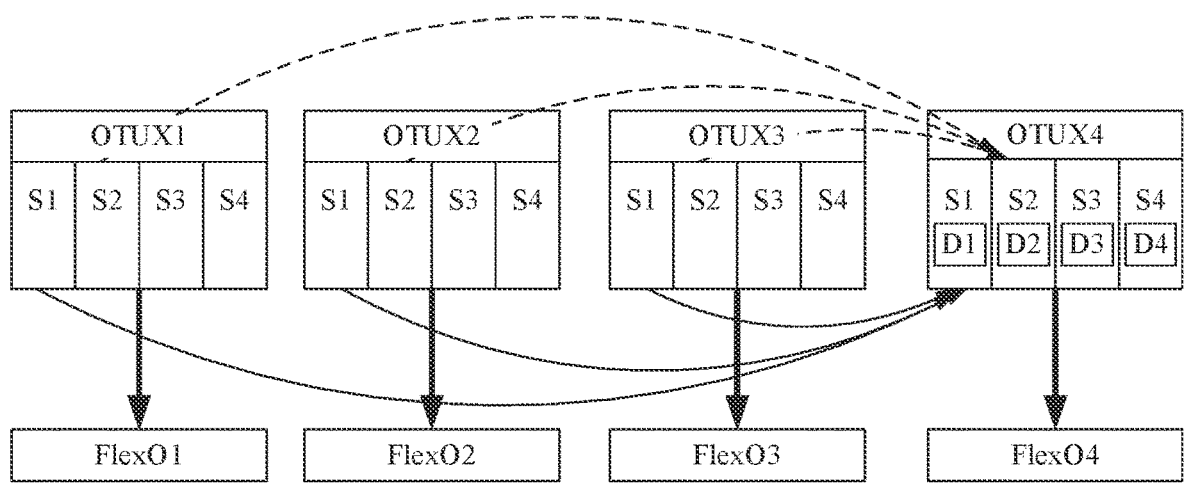
FIG. 4 is a schematic diagram of generating n FlexO frames based on an OTUXn signal according to an embodiment of this application.

FIG. 4 is a schematic diagram of generating an OTUXn signal according to the first implementation and mapping the OTUXn signal to a FlexO frame according to an embodiment of this application. As shown in FIG. 4, assuming that n=4 and m=4, the OTUXn structure may include four OTUX frames: OTUX1, OTUX2, OTUX3, and OTUX4. Each OTUX frame includes four slots, and the service data is mapped to slots of OTUX1, OTUX2, and OTUX3. Then the transmit-end device may perform redundancy coding on first slots S1 of the OTUX1, OTUX2, and OTUX3 frames to obtain check data D1 corresponding to S1, and place D1 in S1 of OTUX4; perform redundancy coding on second slots S2 of OTUX1, OTUX2, and OTUX3 to obtain check data D2 corresponding to S2, and place D2 in S2 of OTUX4: and so on. Finally, OTUX1, OTUX2, and OTUX3 in the OTUXn are OTUX data frames, and OTUX4 is an OUTX check frame. Then the four OTUX frames are respectively mapped to four FlexO frames to obtain FlexO1, FlexO2, FlexO3, and FlexO4. FlexO1, FlexO2, and FlexO3 are FlexO data frames, and FlexO4 is a FlexO check frame.

It should be noted that, in this embodiment of this application, a value of r may be determined based on one or more of the following: a port rate included in a FlexO group interface, a value of X, and a quantity of FlexO frames that can be recovered. For example, when X is 100 and a port rate of a physical port included in the FlexO group interface is 100 G, the value of r is set to 1, to ensure that the service data can be recovered when transmission of one FlexO frame encounters a problem. If X is 100 and the port rate included in the FlexO group interface is 200 G, the value of r is set to 2, to ensure that the service data can be recovered when transmission of one FlexO frame encounters a problem. For another example, the value of r is 2, to ensure that the service data can be recovered when transmission of two FlexO frames encounters a problem.

In addition, it should be noted that, in this embodiment of this application, the performing redundancy coding may mean performing coding by using any one of a Reed-Solomon (reed-solomon, RS) type erasure code, a low-density erasure code, an array code, a digital fountain code, a regenerating code based on network coding, and a local check code. Certainly, another coding scheme that can be used to generate redundancy data for recovering service data may be alternatively used. This is not specifically limited in this embodiment of this application.

Optionally, if the OTUXn signal is generated according to the second implementation in step 201, the transmit-end device may generate the at least n FlexO frames in the following two manners.

In a first manner, n OTUX data frames are obtained based on the OTUXn signal, where the n OTUX data frames carry the service data; redundancy coding is performed based on the n OTUX data frames to obtain r OTUX check frames, where the r OTUX check frames carry the service check data; and n FlexO data frames are generated based on the n OTUX data frames, the r FlexO check frames are generated based on the r OTUX check frames, and the n FlexO data frames and the r FlexO check frames are used as n+r FlexO frames. In other words, the at least n FlexO frames are specifically the n+r FlexO frames.

Figure 5:
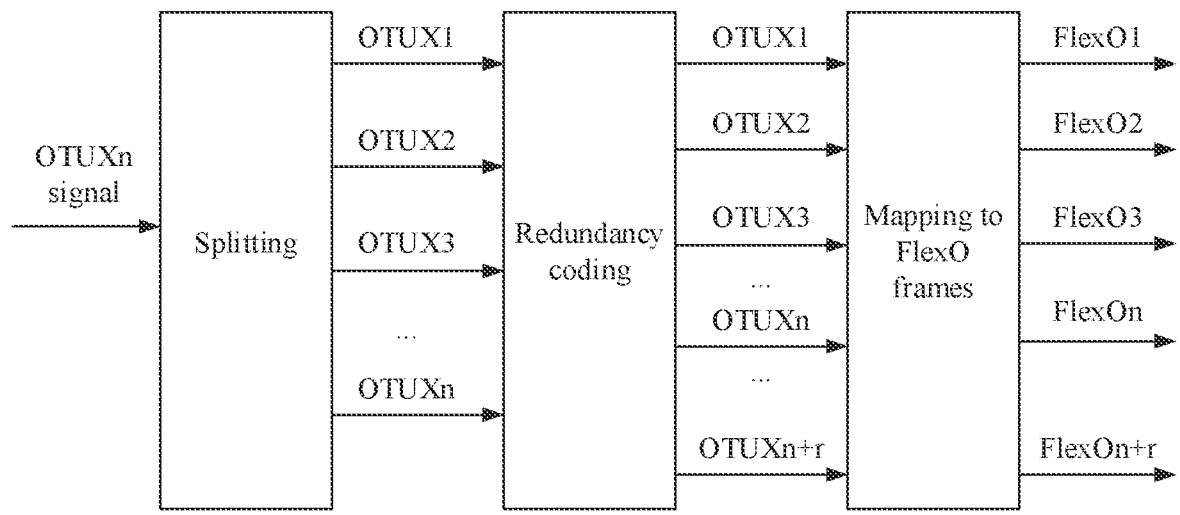
FIG. 5 is a schematic diagram of generating n+r FlexO frames based on an OTUXn signal according to an embodiment of this application.

FIG. 5 is a schematic diagram of obtaining n+r FlexO frames based on n OTUX frames included in an OTUXn signal according to an embodiment of this application. As shown in FIG. 5, the transmit-end device may split the OTUXn signal into the n OTUX data frames, and then perform redundancy coding on the n OTUX frames to obtain r OTUX check frames. Then the transmit-end device maps the n OTUX data frames and the r OTUX check frames to the n+r FlexO frames in a one-to-one manner. n FlexO frames that are in the n+r FlexO frames and that are obtained by mapping the n OTUX data frames are FlexO data frames. r FlexO frames that are in the n+r FlexO frames and that are obtained by mapping the r OTUX check frames are FlexO check frames. It should be noted that the splitting step in FIG. 5 is optional.

In a second manner, n OTUX data frames are obtained based on the OTUXn signal, where the n OTUX data frames carry the service data; and n FlexO data frames are generated based on the n OTUX data frames, redundancy coding is performed based on the n FlexO data frames to obtain the r FlexO check frames, and the n FlexO data frames and the r FlexO check frames are used as n+r FlexO frames.

Figure 6:
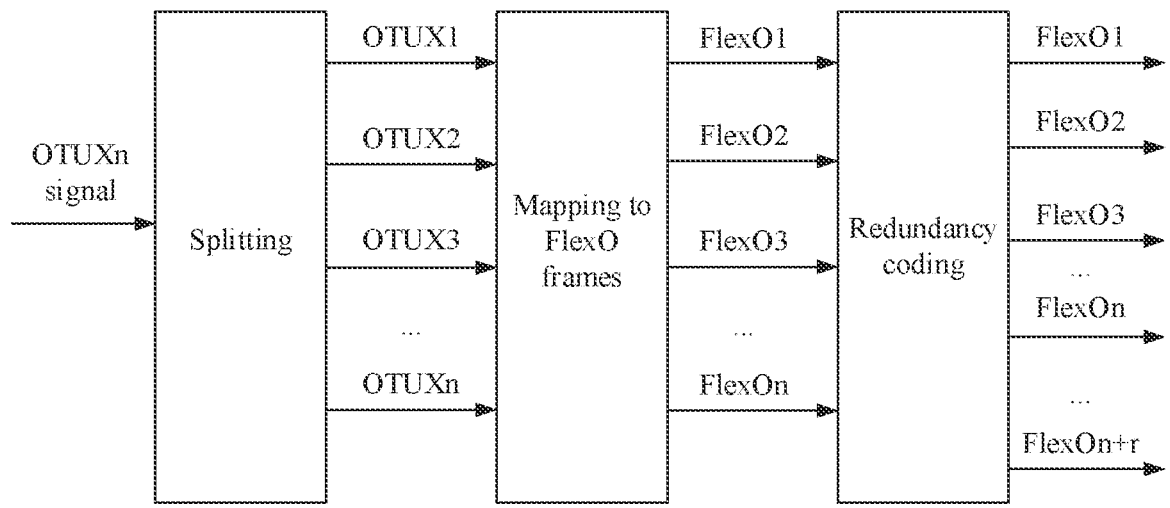
FIG. 6 is another schematic diagram of generating n+r FlexO frames based on an OTUXn signal according to an embodiment of this application.

In this implementation, as shown in FIG. 6, after obtaining the n OTUX data frames based on the OTUXn signal, the transmit-end device may directly map the n OTUX data frames to n FlexO frames in a one-to-one correspondence, to obtain the n FlexO data frames. Then, if X is not greater than the port rate of the physical port included in the FlexO group interface, the transmit-end device may perform redundancy coding on the n FlexO data frames to obtain the r FlexO check frames. In this case, the at least n FlexO frames generated based on the OTUXn signal are the n+r FlexO frames including the n FlexO data frames and the r FlexO check frames.

Optionally, if X is greater than the port rate of the physical port included in the FlexO group interface, after mapping the n OTUX data frames to the n FlexO frames in a one-to-one correspondence, the transmit-end device may split the n FlexO frames based on the port rate of the physical port, and perform redundancy coding based on a plurality of FlexO frames obtained through splitting, to obtain the r FlexO check frames. For example, when X=100 and the port rate of the physical port included in the FlexO group interface is 50 G, after obtaining the n FlexO data frames through mapping, the transmit-end device may split each FlexO data frame into two parts, and then perform redundancy coding based on 2n FlexO data frames obtained through splitting, to obtain a FlexO check frame.

It should be noted that the aforementioned OTUX data frame may include a first overhead, and the OTUX check frame may include a second overhead. In this case, both the first overhead and the second overhead are OTUX overheads of an OTUX frame. The first overhead and the second overhead each include an FA byte, a multiplex structure identifier (multiplex structure identifier, MSI) overhead, and an in-line monitoring indication code. The MSI overhead in the second overhead includes frame indication information used to indicate that a corresponding OTUX frame is an OTUX check frame. The in-line monitoring indication code is used to indicate whether a bit error rate of a corresponding OTUX frame is greater than the reference bit error rate. In addition, the second overhead is used to carry information obtained by checking information in the first overhead other than the FA byte, the MSI overhead, and the in-line monitoring indication code.

It can be learned from the schematic diagram of the frame structure of the OTUX frame shown in FIG. 3 that the OTUX frame includes the OTU overhead, the ODU overhead, and the OPU overhead. In some embodiments of this application, an OTU overhead, an ODU overhead, and an OPU overhead included in an OTUX data frame may be collectively referred to as a first overhead, and an OTU overhead, an ODU overhead, and an OPU overhead included in an OTUX check frame may be collectively referred to as a second overhead. The first overhead and the second overhead each include an FA byte used for the receive-end device to align frames. In addition, the OPU overhead included in the first overhead and the OPU overhead included in the second overhead each include an MSI overhead. The MSI overhead in the first overhead includes indication information used to indicate a service to which service data carried in a corresponding OTUX data frame belongs. The MSI overhead in the second overhead includes frame indication information used to indicate that a corresponding OTUX frame is a check frame.

It should be noted that, if the OTUXn signal is generated according to the first implementation in step 201, the MSI overhead included in the second overhead may further include slot indication information used to indicate whether a corresponding slot is a check slot. The check slot is a slot in which check data is placed. For example, for any slot of an OTUX check frame, if the slot is a check slot, a tributary port (Tributary Port) part in an MSI overhead may be used to carry slot indication information; or if the slot is not a check slot, a tributary port part may carry indication information used to indicate a service to which data in a corresponding slot belongs.

Optionally, the transmit-end device may occupy a reserved field in an OTU overhead or an ODU overhead to carry an in-line monitoring indication code, so that the receive-end device detects, based on the in-line monitoring indication code, for an OTUX frame whose bit error rate is greater than the reference bit error rate.

During specific implementation, one or more of frame indication information, slot indication information, and an in-line monitoring indication code may also be carried in an overhead of a FlexO frame according to a specific requirement. In this case, both a first overhead and a second overhead are overheads of the FlexO frame. In addition, the overhead of the FlexO frame may further carry a port number of a corresponding physical port, to ensure a sequence for receiving the FlexO frame. This is not limited in this embodiment of this application.

Step 203; The transmit-end device sends the at least n FlexO frames through a FlexO group interface.

After generating the at least n FlexO frames based on the OTUXn signal, the transmit-end device may send the at least n FlexO frames through the FlexO group interface.

It should be noted that, in this embodiment of this application, the at least n FlexO frames may be sent in different manners depending on different port rates of a physical port included in the FlexO group interface and different rates of the OTUXn signal.

For example, if a port rate of the physical port included in the FlexO group interface is equal to X, the transmit-end device may send the at least n FlexO frames respectively through at least n physical ports included in the FlexO group interface. Each physical port is used to send one FlexO frame. In this case, a port quantity of physical ports included in the FlexO group interface is equal to a quantity of FlexO frames. For example, when X is equal to 100 and the port rate of the physical port included in the FlexO group interface is 100 G, the transmit-end device may send one FlexO frame by using each physical port.

Optionally, if a port rate of the physical port included in the FlexO group interface is greater than X, the transmit-end device may send at least two FlexO frames by using each of a plurality of physical ports included in the FlexO group interface. For example, when X=50 and the port rate of the physical port included in the FlexO group interface is 100 G, the transmit-end device may send two FlexO frames by using one physical port. In this case, a quantity of physical ports included in the FlexO group interface may be half of a quantity of FlexO frames.

Optionally, if a port rate of the physical port included in the FlexO group interface is less than X, the transmit-end device may send each of the at least n FlexO frames through at least two physical ports in a plurality of physical ports bound to the FlexO group interface. For example, when X=100 and the port rate of the physical port included in the FlexO group interface is 50 G, the transmit-end device may split each of the at least n FlexO frames into two parts by using the method described in the second manner in step 202, and then send the FlexO frame by using two physical ports.

After the transmit-end device sends the at least n FlexO frames through the FlexO group interface, if bit error rates of k FlexO frames in the at least n FlexO frames are greater than the reference bit error rate due to a physical port failure or another reason, the receive-end device may restore, by using steps 204 and 205, service data carried in the k FlexO frames, to recover, in a lossless manner, the service data carried in the OTUXn.

Step 204: The receive-end device receives m FlexO frames.

The receive-end device may receive the m FlexO frames through the FlexO group interface. A quantity of the m FlexO frames may be equal to a quantity of FlexO frames sent by the transmit-end device. In other words, the m FlexO frames are the at least n FlexO frames sent by the transmit-end device. Certainly, in a possible case, some physical ports in the FlexO group interface may fail, and consequently, transmission of a part of the at least n FlexO frames sent by the transmit-end device is interrupted. In this case, the m FlexO frames may be only a part of the at least n FlexO frames sent by the transmit-end device.

If any one of the plurality of physical ports included in the FlexO group interface does not receive a FlexO frame, a current in-line monitoring indication code of the physical port may be set to a specified value.

Step 205: If the receive-end device detects, based on the m FlexO frames, that the at least n FlexO frames sent by the transmit-end device include k FlexO frames whose bit error rates are greater than the reference bit error rate, the receive-end device restores the service data based on first service check data and first service data that are carried in a plurality of first FlexO frames in the m FlexO frames.

The plurality of first FlexO frames are FlexO frames that are in the m FlexO frames and whose bit error rates are not greater than the reference bit error rate. In addition, the first service check data carried in the plurality of first FlexO frames may be all check data carried in the r FlexO check frames in the at least n FlexO frames sent by the transmit-end device, or may be a part of check data carried in a part of the r FlexO check frames. The first service data may be a part of all service data carried in a plurality of FlexO data frames in the at least n FlexO frames sent by the transmit-end device, or may be a part of service data carried in a part of a plurality of FlexO data frames.

Specifically, in an embodiment of this application, the m FlexO frames may be the at least n FlexO frames sent by the transmit-end device, or may be a part of the at least n FlexO frames sent by the transmit-end device. In addition, when the m FlexO frames are the at least n FlexO frames sent by the transmit-end device, the m FlexO frames may or may not include a FlexO frame whose bit error rate exceeds the reference bit error rate. Based on this, after receiving the m FlexO frames, the receive-end device may first detect, based on an in-line monitoring indication code carried in the m FlexO frames, whether the at least n FlexO frames sent by the transmit-end device include k FlexO frames whose bit error rates are greater than the reference bit error rate.

The receive-end device may determine, based on a plurality of FlexO frames that are received through a plurality of physical ports in the FlexO group interface before the m FlexO frames are received, a reference code of a FlexO frame previously received by using each of the plurality of physical ports; and determine, based on the reference code of the FlexO frame previously received by using each of the plurality of physical ports and an in-line monitoring indication code carried in each of the m FlexO frames, whether the at least n FlexO frames include k FlexO frames whose bit error rates are greater than the reference bit error rate.

For example, if an in-line monitoring indication code is carried in a frame overhead of a FlexO frame, the receive-end device may obtain m in-line monitoring indication codes from frame overheads of the m FlexO frames. Then the receive-end device may establish a correspondence between the m in-line monitoring indication codes and a plurality of physical ports in the FlexO group interface based on ports used to receive the m FlexO frames, to obtain an in-line monitoring indication code of a FlexO frame currently received by using each of the plurality of physical ports in the FlexO group interface. As described above, if a FlexO frame transmitted through a physical port is lost due to a failure of the physical port, the physical port currently has not received the FlexO frame. In this case, the foregoing specified value may be used as an in-line monitoring indication code corresponding to a FlexO frame currently received by the physical port. Then the receive-end device may determine, based on a plurality of FlexO frames that are received through a plurality of physical ports in the FlexO group interface before the m FlexO frames are received, a reference code of a FlexO frame previously received by using each of the plurality of physical ports; and compare the reference code of the FlexO frame previously received by using each physical port with an in-line monitoring indication code of a FlexO frame currently received by the physical port. If the reference code and the in-line monitoring indication code are inconsistent, it indicates that the at least n FlexO frames sent by the transmit-end device include a FlexO frame whose bit error rate is greater than the reference bit error rate. In this case, the FlexO frame whose bit error rate is greater than the reference bit error rate may be determined based on a quantity of inconsistent in-line monitoring indication codes. If a quantity of FlexO frames whose bit error rates are greater than the reference bit error rate is not greater than r, it may be determined that the at least n FlexO frames sent by the transmit-end device include k FlexO frames whose bit error rates are greater than the reference bit error rate.

Optionally, if an in-line monitoring indication code is carried in an OTUX overhead of an OTUX frame, the receive-end device may perform demapping on each of the m FlexO frames to obtain m OTUX frames that are in a one-to-one correspondence with the m FlexO frames. Then the receive-end device may obtain m in-line monitoring indication codes from the m OTUX frames, and determine, based on the m in-line monitoring indication codes with reference to the foregoing method, whether the at least n FlexO frames sent by the transmit-end device include k FlexO frames whose bit error rates are greater than the reference bit error rate.

After determining that the at least n FlexO frames sent by the transmit-end device include k FlexO frames whose bit error rates are greater than the reference bit error rate, the receive-end device may restore the service data based on the m FlexO frames. The m FlexO frames may include a FlexO frame whose bit error rate is greater than the reference bit error rate. However, the FlexO frame whose bit error rate is greater than the reference bit error rate cannot be used to restore the service data. Based on this, the receive-end device may restore the service data based on the first service data and the first service check data that are carried in the plurality of first FlexO frames that are in the m FlexO frames and whose bit error rates are not greater than the reference bit error rate.

For example, if the transmit-end device obtains a FlexO check frame through mapping based on an OTUX check frame, an implementation process of the restoring, by the receive-end device, the service data based on the first service data and the first service check data that are carried in the plurality of first FlexO frames may be: performing demapping on each of the m FlexO frames to obtain m OTUX frames that are in a one-to-one correspondence with the m FlexO frames; restoring OTUX frames corresponding to the k FlexO frames in the at least n FlexO frames based on first service check data and first service data that are carried in a plurality of first OTUX frames that are in the m OTUX frames and that are in a one-to-one correspondence with the plurality of first FlexO frames, where the k FlexO frames are FlexO frames that are in the at least n FlexO frames and whose bit error rates are greater than the reference bit error rate: and restoring the service data based on the first service data carried in the plurality of first OTUX frames and second service data carried in the restored OTUX frames corresponding to the k FlexO frames.

When an OTUX overhead of each OTUX frame includes an FA byte, the receive-end device may first align the m OTUX frames based on FA bytes. After aligning the m OTUX frames, the receive-end device may determine that an OTUX frame that is in the plurality of first OTUX frames and whose MSI overhead includes frame indication information is an OTUX check frame, and determine that a remaining OTUX frame in the plurality of first OTUX frames other than the OTUX check frame is an OTUX data frame.

If the transmit-end device performs redundancy coding on an OTUX data frame to obtain an OTUX check frame, after determining the check frame and the data frame in the plurality of first OTUX frames, the receive-end device may recover OTUX overheads of the OTUX frames corresponding to the k FlexO frames based on an OTUX overhead of the OTUX check frame in the plurality of first OTUX frames and an OTUX overhead of the OTUX data frame in the plurality of first OTUX frames, and recover service data carried in the OTUX frames of the k FlexO frames based on first service data carried in the OTUX data frame and first service check data carried in the OTUX check frame, to finally obtain the OTUX frames corresponding to the k FlexO frames. It should be noted that FA bytes and MSI overheads that are included in OTUX overheads of the plurality of first OTUX frames are not used to recover the OTUX overheads of the OTUX frames corresponding to the k FlexO frames, and when the OTUX overheads further include in-line monitoring indication codes, the in-line monitoring indication codes are not used to restore the OTUX overheads of the OTUX frames corresponding to the k FlexO frames either.

It should be noted that, if the transmit-end device performs redundancy coding on a slot included in an OTUX data frame to obtain an OTUX check frame, it can be learned from the descriptions in step 202 that an MSI slot of the OTUX check frame may further include slot indication information. In this case, the receive-end device may recover, based on each check slot included in the OTUX check frame and a corresponding slot in the OTUX data frame, slots included in the OTUX frames corresponding to the k FlexO frames, to obtain the OTUX frames corresponding to the k FlexO frames. The slots included in the OTUX frames corresponding to the k FlexO frames include a slot used to place an OTUX overhead.

After restoring the OTUX frames corresponding to the k FlexO frames, the receive-end device may determine an OTUX data frame in the restored OTUX frames based on MSI overheads in the restored k OTUX frames, and may restore all the service data based on second service data carried in the restored OTUX data frame and the first service data carried in the OTUX data frame in the plurality of first OTUX frames.

Optionally, if the transmit-end device performs redundancy coding on a FlexO data frame to obtain a FlexO check frame, the receive-end device may restore frame overheads of the k FlexO frames based on frame overheads of a plurality of first FlexO frames, and restore service data carried in the k FlexO frames based on service data carried in a FlexO data frame in the plurality of first FlexO frames and service check data carried in a FlexO check frame in the plurality of first FlexO frames, to obtain the k FlexO frames.

After restoring the k FlexO frames, the receive-end device may determine a FlexO data frame in the restored k FlexO frames based on frame indication information carried in a frame overhead of a FlexO frame, and may restore all the service data based on service data carried in the FlexO data frame in the k FlexO frames and the first service data of the FlexO data frame in the plurality of first FlexO frames.

In an embodiment of this application, the transmit-end device may generate the OTUXn signal carrying the service data, and generate the at least n FlexO frames based on the OTUXn signal, where the r FlexO frames in the at least n FlexO frames carry the service check data, and the service check data may be used to restore the service data when the bit error rates of the k FlexO frames are greater than the reference bit error rate. Then the transmit-end device may send the at least n FlexO frames through the FlexO group interface. In this way, wien a bit error rate of not more than r FlexO frames is greater than the reference bit error rate because not more than r physical ports in physical ports included in the FlexO group interface fail or due to another reason, the receive-end device may restore the service data by using a received FlexO frame. This implements lossless restoration of the service data transmitted through a plurality of physical ports in the FlexO group interface.

Figure 7:
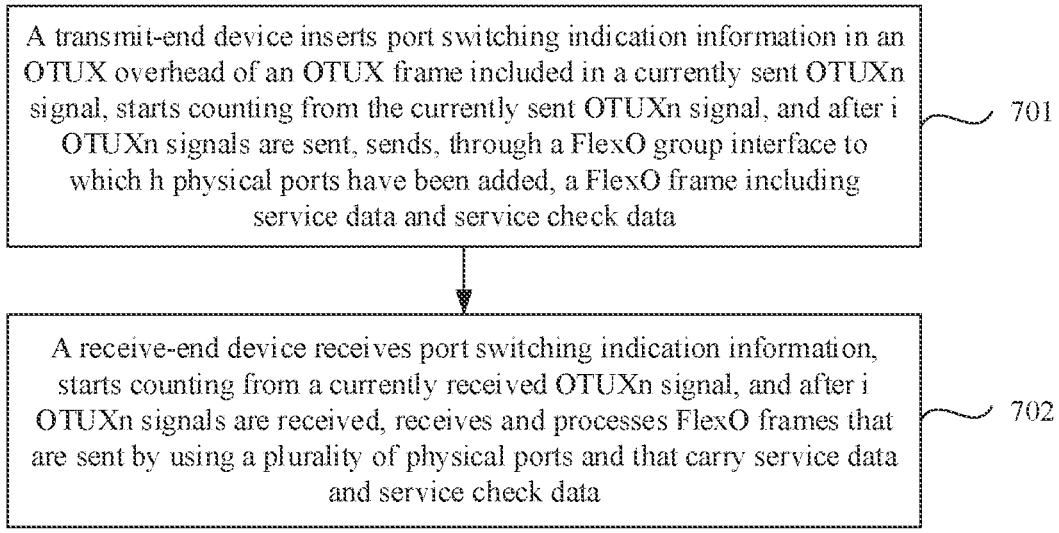
FIG. 7 is a schematic flowchart of a method for adding a physical port in a lossless manner according to an embodiment of this application.

Optionally, an overhead of an OTUX frame may further include port switching indication information, to increase or decrease, synchronously at a transmit end and a receive end in a lossless manner, a quantity of a plurality of physical ports included in the FlexO group interface. For example, FIG. 7 is a schematic flowchart of a method for adding a physical port in a lossless manner. As shown in FIG. 7, the method may include the following steps.

Step 701: A transmit-end device inserts port switching indication information in an OTUX overhead of an OTUX frame included in a currently sent OTUXn signal, starts counting from the currently sent OTUXn signal, and after i OTUXn signals are sent, sends, through a FlexO group interface to which h physical ports have been added, a FlexO frame including service data and service check data.

In some embodiments of this application, the port switching indication information is used to indicate to add h physical ports. The port switching indication information may include i. For example, a value of i may be set to 2, 3, 4, or another value. This is not limited in this embodiment of this application.

It should be noted that, in some embodiments of this application, when detecting that original physical ports included in the FlexO group interface include a failed port, the transmit-end device may add a new physical port by adding port indication switching information to an OTUX overhead, and remove the failed physical port, to avoid failed physical ports. Alternatively, when detecting, based on a signal rate of an OTUXn signal, that a capacity needs to be increased or decreased, the transmit-end device may add a physical port or remove a physical port by adding port indication switching information to an OTUX overhead. The following mainly describes a process of adding a physical port in a lossless manner.

Specifically, the transmit-end device may insert port switching indication information in OTUX overheads of all OTUX frames included in the currently sent OTUXn signal, or may insert the port switching indication information in an OTUX overhead of any OTUX frame included in the currently sent OTUXn signal, or may insert the port switching indication information in an OTUX overhead of an OTUX frame that is sent through a target physical port and that does not include service data. This is not limited in this embodiment of this application. In addition, the port switching indication information may be carried in an OTU overhead or an ODU overhead in the OTUX overhead. This is not limited in this embodiment of this application.

For an implementation process of sending an OTUXn signal by the transmit-end device through a FlexO group interface, refer to the related implementation process in the service data processing method described in the foregoing embodiments. Details are not described in this embodiment of this application again.

The transmit-end device starts counting from the currently sent OTUXn signal, and after i OTUXn signals are sent, the transmit-end device may send an OTUXn signal jointly through a target physical port and an original physical port in the FlexO group interface.

Optionally, before inserting the port switching indication information in an OTUX overhead of an OTUX frame included in the currently sent OTUXn signal, the transmit-end device may determine, by interacting with the receive-end device, whether the added h physical ports are normal; and determine, by interacting with the receive-end device, whether the added h physical ports have been aligned with the original physical ports in the FlexO group interface. For ease of subsequent description, the added h physical ports are referred to as a target physical port in the following descriptions.

For example, an implementation process of determining, by the transmit-end device by interacting with the receive-end device, whether the target physical port is normal may be as follows: The transmit-end device sends a detection sequence to the receive-end device through the target physical port. After receiving the detection sequence, the receive-end device may detect whether a loss of the detection sequence is within a preset range. If the loss of the detection sequence is beyond the preset range, the receive-end device may send an alarm to the transmit-end device. If the loss of the detection sequence is within the preset range, the receive-end device may send an acknowledgement message or may not return a message. When receiving the alarm, the transmit-end device may determine that the target physical port is abnormal. If the transmit-end device receives no alarm sent by the receive-end device within preset duration or the transmit-end device receives an acknowledgement message from the receive-end device within preset duration, the transmit-end device may determine that the target physical port is normal.

When determining that the target physical port is normal, the transmit-end device may determine, by interacting with the receive-end device, whether the added h physical ports have been aligned with the original physical ports in the FlexO group interface. An example implementation process may be as follows: The transmit-end device sends a target FlexO frame through the target physical port, where the target FlexO frame does not include service data, and the target FlexO frame includes a frame overhead. The receive-end device aligns, based on the frame overhead of the target FlexO frame, a plurality of physical ports included in the FlexO group interface, where the plurality of physical ports include the target physical port. When receiving an alignment notification message sent by the receive-end device, the transmit-end device determines that the target physical port has been aligned with the original physical ports in the FlexO group interface.

When sending, through an original physical port in the FlexO group interface, a FlexO frame carrying service data and service check data, the transmit-end device may send the target FlexO frame without service data through the target physical port at the same time. However, the target FlexO frame carries the frame overhead, and the frame overhead includes an FA byte. Alternatively, an OTUX frame based on which the target FlexO frame is obtained through mapping carries an OTUX overhead, and the OTUX overhead includes an FA byte.

After receiving the target FlexO frame, the receive-end device may align a plurality of physical ports based on the target FlexO frame and a FlexO frame sent by another physical port. After alignment is completed, the receive-end device sends an alignment notification message to the transmit-end device. The receive-end device may send the alignment notification message at a control layer, and may send the notification message by using a reverse in-band overhead.

Step 702: The receive-end device receives port switching indication information, starts counting from a currently received OTUXn signal, and after i OTUXn signals are received, receives and processes FlexO frames that are sent through a plurality of physical ports and that carry service data and service check data.

For an implementation process of receiving and processing, by the receive-end device, a FlexO frame sent through the FlexO group interface, refer to the related implementation process in the service data processing method described in the foregoing embodiments. Details are not described in this embodiment of this application again. It should be noted that, when the receive-end device processes a FlexO frame by using the service data processing method described in the foregoing embodiments, and restores an OTUX overhead of an OTUX frame, like an FA byte, an MSI overhead, and an in-line monitoring indication code, the port switching indication information is not checked either.

In some embodiments of this application, the transmit-end device may dynamically increase a quantity of ports in the FlexO group interface by inserting port switching indication information in a reserved overhead included in an OTU overhead or an ODU overhead. In addition, in a process of increasing the quantity of ports in the FlexO group interface, transmission of service data is not affected, thereby increasing, in a lossless manner, a quantity of a plurality of physical ports included in the FlexO group interface.

The foregoing embodiment mainly describes the process of adding a physical port in a lossless manner. Optionally, when removing a physical port in a lossless manner, the transmit-end device may insert port switching indication information in an OTUX overhead of an OTUX frame included in a currently sent OTUXn signal. In this case, the port switching indication information is used to indicate to: start counting from the currently sent OTUXn signal, and after i OTUXn signals are sent, remove a target physical port. Correspondingly, after receiving the port switching indication information, the receive-end device may start counting from a currently received OTUXn signal, and after i OTUXn signals are received, receive and process a FlexO frame sent through a FlexO group interface in which the physical port has been removed.

It should be noted that, in actual application, the process of adding a physical port in a lossless manner and the process of removing a physical port in a lossless manner may be combined. To be specific, the transmit-end device may add a new physical port, remove a failed port from original ports, and use the newly added physical port to replace the failed port to transmit data, thereby ensuring availability of the FlexO group interface.

In addition, it should be further noted that, in the foregoing embodiments, the port switching indication information may be carried in an OTUX overhead of an OTUX frame for delivery. In a possible implementation, the port switching indication information may be alternatively carried in a frame overhead of a FlexO frame for delivery. For a specific implementation, refer to the foregoing embodiments. Details are not described in this embodiment of this application again.

The following describes a service data processing apparatus provided in the embodiments of this application.

Figure 8:
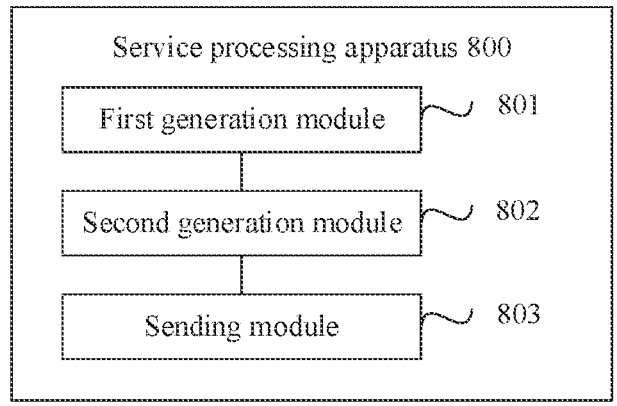
FIG. 8 is a schematic structural diagram of a service data processing apparatus according to an embodiment of this application.

Refer to FIG. 8. An embodiment of this application provides a service data processing apparatus 800, including:

a first generation module 801, configured to generate an OTN encapsulated signal carrying service data;

a second generation module 802, configured to generate at least n FlexO frames, where the at least n FlexO frames are used to carry the OTN encapsulated signal, and the at least n FlexO frames include r FlexO check frames and a plurality of FlexO data frames; the plurality of FlexO data frames carry the service data, and the r FlexO check frames carry service check data, where the service check data is used to restore the service data when bit error rates of k FlexO frames are greater than a reference bit error rate; and k, r, and n are all positive integers, k is not greater than r, and r is not greater than n; and a sending module 803, configured to send the at least n FlexO frames through a FlexO group interface.

Optionally, the OTN encapsulated signal is an OTUXn signal.

Optionally, the OTUXn signal includes n OTUX frames, where the n OTUX frames include n-r OTUX data frames and r OTUX check frames, and the n-r OTUX data frames carry the service data. Each of the n-r OTUX data frames and the r OTUX check frames includes w timeslots.

The first generation module is specifically configured to perform redundancy coding on the $t^{th}$ timeslot of the n-r OTUX data frames to obtain corresponding check data, where the check data is placed in the $t^{th}$ timeslot of the OTUX check frames, and t is any positive integer within (0, w−1).

The second generation module is specifically configured to generate the r FlexO check frames based on the r OTUX check frames, generate n-r FlexO data frames based on the n-r OTUX data frames, and use the r FlexO check frames and the n-r FlexO data frames as the n FlexO frames.

Optionally, each OTUX check frame or each FlexO check frame includes a first OTUX overhead, and the first OTUX overhead includes a multiplexing structure identifier MSI overhead. In addition, the MSI overhead included in the first OTUX overhead includes timeslot indication information used to indicate whether each timeslot in a corresponding OTUX frame is a check timeslot. The check timeslot is a timeslot in which check data is placed.

Optionally, the second generation module is specifically configured to:

obtain n OTUX data frames based on the OTUXn signal, where the n OTUX data frames carry the service data;

perform redundancy coding based on the n OTUX data frames to obtain the r OTUX check frames, where the r OTUX check frames carry the service check data; and generate n FlexO data frames based on the n OTUX data frames, generate the r FlexO check frames based on the r OTUX check frames, and use the n FlexO data frames and the r FlexO check frames as n+r FlexO frames.

Optionally, the second generation module is specifically configured to:

obtain the n OTUX data frames based on the OTUXn signal, where the n OTUX data frames carry the service data; and generate the n FlexO data frames based on the n OTUX data frames, perform redundancy coding based on the n FlexO data frames to obtain the r FlexO check frames, and use the n FlexO data frames and the r FlexO check frames as the n+r FlexO frames.

Optionally, each OTUX check frame or each FlexO check frame includes the first OTUX overhead. The first OTUX overhead and a second OTUX overhead each include a frame alignment FA byte and the MSI overhead, where the MSI overhead included in the first OTUX overhead includes frame indication information used to indicate that a corresponding OTUX frame is an OTUX check frame. The first OTUX overhead is used to check information other than the FA byte and the MSI overhead in the second OTUX overhead.

Optionally, the first OTUX overhead and the second OTUX overhead each include an in-line monitoring indication code, and the in-line monitoring indication code is used to indicate whether a bit error rate of a corresponding OTUX frame is greater than the reference bit error rate.

Optionally, the first OTUX overhead or the second OTUX overhead further includes port switching indication information.

Optionally, the port switching indication information is used to indicate to: start counting from a currently sent OTUXn signal, and after i OTUXn signals are sent, send a FlexO frame through a FlexO group interface to which h physical ports have been added. Alternatively, the port switching indication information is used to indicate to: start counting from a currently sent OTUXn signal, and after i OTUXn signals are sent, remove h physical ports in a plurality of physical ports included in the FlexO group interface, and send a FlexO frame through the FlexO group interface in which the ports have been removed.

Optionally, the sending module is specifically configured to:

send each of the at least n FlexO frames through at least two physical ports in a plurality of physical ports bound to the FlexO group interface; or send at least two FlexO frames in the at least n FlexO frames through each of the plurality of physical ports included in the FlexO group interface.

Optionally, performing redundancy coding refers to performing coding by using any one of a Reed-Solomon RS type erasure code, a low-density erasure code, an array code, a digital fountain code, a regenerating code based on network coding, and a local check code.

In some embodiments of this application, the OTUXn signal carrying the service data may be generated, and the at least n FlexO frames are generated based on the OTUXn signal, where the r FlexO frames in the at least n FlexO frames carry the service check data, and the service check data may be used to restore the service data when the bit error rates of the k FlexO frames are greater than the reference bit error rate. Then, a transmit-end device may send the at least n FlexO frames through the FlexO group interface. In this way, when a bit error rate of no more than r FlexO frames is greater than the reference bit error rate because no more than r physical ports in physical ports included in the FlexO group interface fail or due to another reason, a receive-end device may restore the service data by using a received FlexO frame. This implements lossless restoration of the service data transmitted through the plurality of physical ports in the FlexO group interface.

Figure 9:
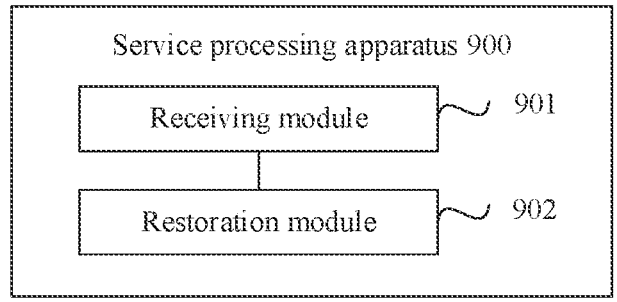
FIG. 9 is a schematic structural diagram of another service data processing apparatus according to an embodiment of this application.

Refer to FIG. 9. An embodiment of this application provides a service data processing apparatus 900. The apparatus 900 includes:

a receiving module 901, configured to receive m FlexO frames through a FlexO group interface, where the m FlexO frames are at least n FlexO frames sent by a transmit-end device or a part of the at least n FlexO frames, the at least n FlexO frames include r FlexO check frames and a plurality of FlexO data frames, the r FlexO check frames carry service check data, and the plurality of FlexO data frames carry service data; and a restoration module 902, configured to: if it is detected, based on the m FlexO frames, that the at least n FlexO frames sent by the transmit-end device include k FlexO frames whose bit error rates are greater than a reference bit error rate, restore the service data based on first service check data and first service data that are carried in a plurality of first FlexO frames in the m FlexO frames, where the plurality of first FlexO frames are FlexO frames whose bit error rates are not greater than the reference bit error rate, the first service data is a part of the service data, and k is a positive integer not greater than r.

Optionally, the restoration module includes:

a demapping submodule, configured to demap each FlexO frame in the m FlexO frames to obtain m OTUX frames that are in a one-to-one correspondence with the m FlexO frames;

a first restoration submodule, configured to restore OTUX frames corresponding to k FlexO frames in the at least n FlexO frames based on first service check data and first service data that are carried in a plurality of first OTUX frames that are in the m OTUX frames and that are in a one-to-one correspondence with the plurality of first FlexO frames, where the k FlexO frames are FlexO frames that are in the at least n FlexO frames and whose bit error rates are greater than the reference bit error rate; and a second restoration submodule, configured to restore the service data based on the first service data carried in the plurality of first OTUX frames and second service data carried in the restored OTUX frames corresponding to the k FlexO frames.

Optionally, each of the m OTUX frames includes an OTUX overhead, and the OTUX overhead of each OTUX frame includes a frame alignment FA byte and a multiplex structure identifier MSI overhead:

the first restoration submodule is specifically configured to:

align the m OTUX frames based on the FA byte in the OTUX overhead of each of the m OTUX frames;

determine that an OTUX frame that is in the plurality of first OTUX frames and whose MSI overhead includes frame indication information is an OTUX check frame, and determine that a remaining OTUX frame in the plurality of first OTUX frames is an OTUX data frame;

check OTUX overhead of the OTUX data frame according to OTUX overhead of the OTUX check frame: and restore service data in the OTUX frames corresponding to the k FlexO frames based on first service data carried in the OTUX data frame and first service check data carried in the OTUX check frame; and Optionally, each of the m FlexO frames includes an in-line monitoring indication code. The in-line monitoring indication code is used to indicate whether a bit error rate of a corresponding FlexO frame is greater than the reference bit error rate.

The apparatus is further configured to determine, based on a plurality of FlexO frames that are received last time through a plurality of physical ports in the FlexO group interface before the m FlexO frames are received, a reference code of a FlexO frame received last time through each of the plurality of physical ports; and determine, based on the reference code of the FlexO frame received last time through each of the plurality of physical ports and the in-line monitoring indication code carried in each of the m FlexO frames, whether the at least n FlexO frames include k FlexO frames whose bit error rates are greater than the reference bit error rate.

Optionally, the apparatus is further configured to: when an OTUX overhead of any one of the m OTUX frames includes port switching indication information, based on the port switching indication information, start counting from a currently received OTUXn signal, and after receiving an $i^{th}$ OTUXn signal, receive a FlexO frame sent through a FlexO group interface to which h physical ports have been added, or receive a FlexO frame sent through a FlexO group interface in which h physical ports have been removed.

In some embodiments of this application, a receive-end device receives the m FlexO frames, restores the k FlexO frames in the at least n FlexO frames sent by the transmit-end device based on the m FlexO frames, and further restores the service data. This implements lossless restoration of the service data when a part of the plurality of physical ports in the FlexO group interface fail.

It should be noted that the UE provided in the foregoing embodiments is described only using division of the foregoing functional modules. In practice, the functions may be allocated to different functional modules for implementation as required. To be specific, an internal structure of an apparatus is divided into different functional modules to implement all or part of the functions described above. In addition, the service data processing apparatus provided in the foregoing embodiment and the service data processing method embodiment belong to a same concept. For a specific implementation process, refer to the method embodiment. Details are not described herein again.

Figure 10:
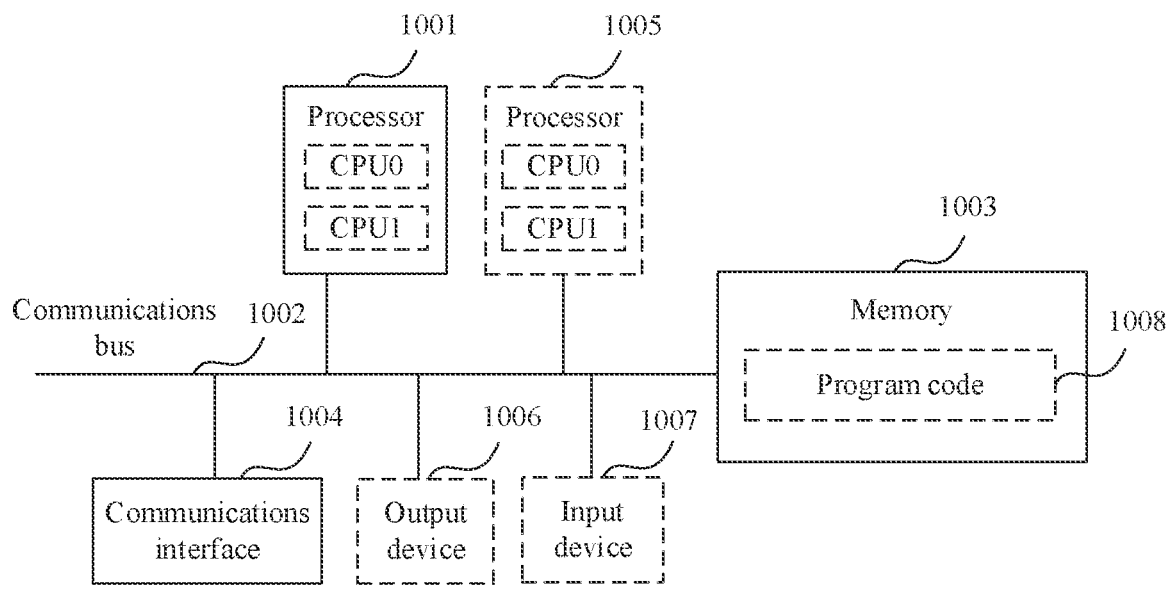
FIG. 10 is a schematic structural diagram of a service data processing device according to an embodiment of this application.

FIG. 10 is a schematic structural diagram of a service data processing device according to an embodiment of this application. Both the transmit-end device and the receive-end device in the foregoing embodiments may be implemented by using the service data processing device shown in FIG. 10. Refer to FIG. 10. The service data processing device includes at least one processor 1001, a communications bus 1002, a memory 1003, and at least one communications interface 1004.

The processor 1001 may be a general-purpose central processing unit (Central Processing Unit, CPU), a microprocessor, an application-specific integrated circuit (application-specific integrated circuit, ASIC), or one or more integrated circuits configured to control program execution of the solutions in this application.

The communications bus 1002 may include a path for transferring information between the foregoing components.

The memory 1003 may be a read-only memory (ROM), another type of static storage device that can store static information and an instruction, a random access memory RAM), or another type of dynamic storage device that can store information and an instruction, or may be an electrically erasable programmable read-only memory (EE-PROM), a compact disc read-only memory CD-ROM), other optical disk storage, optical disc storage (including a compact disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that is accessible by a computer. However, this is not limited thereto. The memory 1003 may exist alone, and is connected to the processor 1001 through the communications bus 1002. The memory 1003 may alternatively be integrated with the processor 1001.

The communications interface 1004 uses any apparatus such as a transceiver to communicate with another device or a communications network, such as an Ethernet, a radio access network (RAN), or a wireless local area network (WLAN).

In specific implementation, in an embodiment, the processor 1001 may include one or more CPUs, for example, a CPU 0 and a CPU 1 shown in FIG. 10.

During specific implementation, in an embodiment, the service data processing device may include a plurality of processors, for example, the processor 1001 and a processor 1005 that are shown in FIG. 10. Each of the processors may be a single-core (single-CPU) processor, or may be a multi-core (multi-CPU) processor. The processor herein may refer to one or more devices, circuits, and/or processing cores configured to process data (for example, a computer program instruction).

During specific implementation, in an embodiment, the service data processing device may further include an output device 1006 and an input device 1007. The output device 1006 communicates with the processor 1001, and may display information in a plurality of manners. For example, the output device 1006 may be a liquid crystal display (LCD), a light emitting diode (LED) display device, a cathode ray tube (CRT) display device, or a projector (projector). The input device 1007 communicates with the processor 1001, and may accept input of a user in a plurality of manners. For example, the input device 1007 may be a mouse, a keyboard, a touchscreen device, or a sensing device.

The memory 1003 is configured to store program code for performing the solution in this application, and the processor 1001 controls execution. The processor 1001 is configured to execute program code 1008 stored in the memory 1003. The program code 1008 may include one or more software modules. The transmit-end device or the receive-end device in the foregoing embodiment may process to-be-sent or received service data by using the processor 1001 and one or more software modules in the program code 1008 in the memory 1003.

Figure 11:
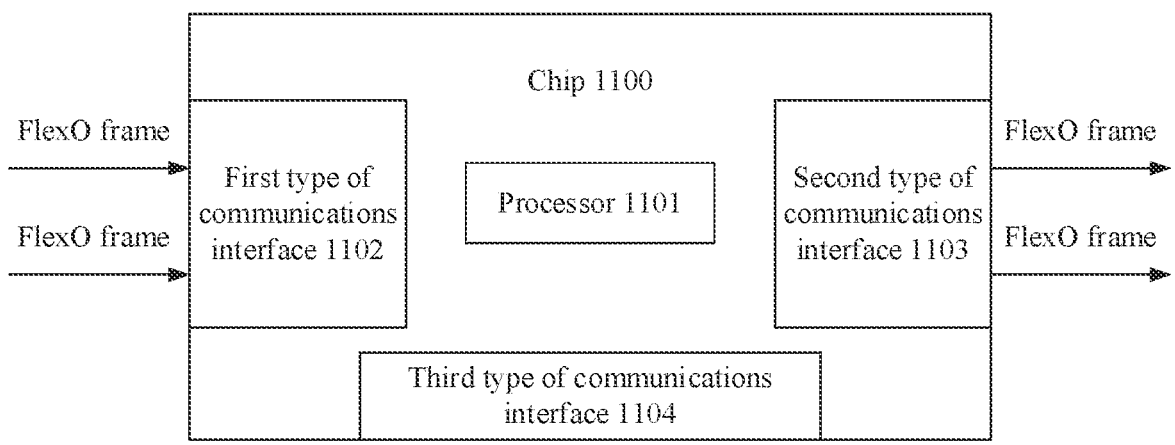
FIG. 11 is a schematic structural diagram of a service data processing chip according to an embodiment of this application.

Refer to FIG. 11. An embodiment of this application further provides a schematic structural diagram of a chip 1100. As shown in FIG. 11, the chip 1100 includes a processor 1101, a first-type communications interface 1102, a second-type communications interface 1103, and a third-type communications interface 1104.

The first-type communications interface 1102 may include a plurality of serializers/deserializers (SerDes). The plurality of SerDeses may receive a signal sent by an optical module.

The processor 1101 is configured to process, by using the service data processing method provided in this application, a signal received by the first-type communications interface, to restore service data. The processor 1101 is further configured to generate, by using the service data processing method provided in this application, an OTUXn signal carrying the service data, and generate at least n FlexO frames based on the OTUXn signal.

The second-type communications interface 1103 may also include a plurality of SerDeses, and the plurality of SerDeses may be configured to send the at least n FlexO frames generated by the processor 1101. It should be noted that, in an optional implementation, the second-type communications interface and the first-type communications interface may be a same communications interface. In other words, the communications interface may be configured to perform both receiving and sending.

The third-type communications interface 1104 may be an interface between a chip and a device, that is, the chip 1100 may be connected to a communications bus of another device through the second-type communications interface 1104.

All or a part of the foregoing embodiments may be implemented by using software, hardware, firmware, or any combination thereof. When software is used to implement the embodiments, the embodiments may be implemented or partially in a form of a computer program product. The computer program product includes one or more computer instructions. When the computer instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state disk (SSD)), or the like.

A person of ordinary skill in the art may understand that all or a part of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A service data processing method, comprising:
generating an optical transport network (OTN) encapsulated signal, wherein the OTN encapsulated signal is used to carry service data, and the OTN encapsulated signal is a signa obtained by encapsulating the service data in an OTN data packet encapsulation format;
generating at least n FlexO (flexible optical transport network) frames, wherein the at least n FlexO frames are used to carry the OTN encapsulated signal, the at least n FlexO frames comprise r FlexO check frames and a plurality of FlexO data frames; the plurality of FlexO data frames carry the service data, and the r FlexO check frames carry service check data, wherein the service check data is used to restore the service data when bit error rates of k FlexO frames are greater than a reference bit error rate; and n is a positive integer larger than 1, k is a positive integer not greater than r, and r is a positive integer not greater than n−1; and
sending the at least n FlexO frames through a flexible optical transport network FlexO group interface.

2. The method according to claim 1, wherein the OTN encapsulated signal is an optical transport unit Xn (OTUXn) signal, with X representing a pre-set data rate and n representing a quantity of frames in the OTUXn signal.

3. The method according to claim 2, wherein the OTUXn signal comprises n OTUX frames, wherein the n OTUX frames comprise n−r OTUX data frames and r OTUX check frames, and the n−r OTUX data frames carry the service data;
each of the n−r OTUX data frames and the r OTUX check frames comprises w timeslots, with w being a positive integer;
performing redundancy coding on service data in the $t^{th}$ timeslot of the n−r OTUX data frames to obtain corresponding check data, wherein the check data is placed in the $t^{th}$ timeslot of the OTUX check frames, and t is any positive integer within (0, w−1); and
generating the r FlexO check frames based on the r OTUX check frames, generating n−r FlexO data frames based on the n−r OTUX data frames, and using the r FlexO check frames and the n−r FlexO data frames as the n FlexO frames.

4. The method according to claim 3, wherein each OTUX check frame or each FlexO check frame comprises timeslot indication information, and the timeslot indication information is used to indicate whether a corresponding timeslot is a check timeslot.

5. The method according to claim 2, wherein the generating at least n FlexO frames comprises:
obtaining n OTUX data frames based on the OTUXn signal, wherein then OTUX data frames carry the service data;
performing redundancy coding based on the n OTUX data frames to obtain r OTUX check frames, wherein the r OTUX check frames carry the service check data; and
generating n FlexO data frames based on the n OTUX data frames, generating the r FlexO check frames based on the r OTUX check frames, and using the n FlexO data frames and the r FlexO check frames as n+r FlexO frames.

6. The method according to claim 2, wherein the generating at least n FlexO frames comprises:
obtaining n OTUX data frames based on the OTUXn signal, wherein the n OTUX data frames carry the service data; and
generating n FlexO data frames based on the n OTUX data frames, performing redundancy coding based on the n FlexO data frames to obtain the r FlexO check frames, and using the n FlexO data frames and the r FlexO check frames as n+r FlexO frames.

7. The method according to claim 5, wherein each OTUX check frame or each FlexO check frame comprises a first overhead, and each OTUX data frame or each FlexO data frame comprises a second overhead; the first overhead and the second overhead each comprise a frame alignment (FA) byte and an MSI overhead, wherein the MSI overhead comprised in the first overhead comprises frame indication information used to indicate that a corresponding frame is a check frame; and the first overhead is used to carry information obtained by checking information other than the FA byte and the MSI overhead in the second overhead.

8. The method according to claim 6, wherein each OTUX check frame or each FlexO check frame comprises a first overhead, and each OTUX data frame or each FlexO data frame comprises a second overhead; the first overhead and the second overhead each comprise a frame alignment (FA) byte and an MSI overhead, wherein the MSI overhead comprised in the first overhead comprises frame indication information used to indicate that a corresponding frame is a check frame; and the first overhead is used to carry information obtained by checking information other than the FA byte and the MSI overhead in the second overhead.

9. The method according to claim 7, wherein the first overhead and the second overhead each comprise an in-line monitoring indication code, and the in-line monitoring indication code is used to indicate whether a bit error rate of a corresponding frame is greater than the reference bit error rate.

10. The method according to claim 8, wherein the first overhead and the second overhead each comprise an in-line monitoring indication code, and the in-line monitoring indication code is used to indicate whether a bit error rate of a corresponding frame is greater than the reference bit error rate.

11. The method according to claim 7, wherein the first overhead or the second overhead further comprises port switching indication information; and
the port switching indication information is used to indicate to start counting from a currently sent OTUXn signal, and after i OTUXn signals are sent, send a FlexO frame through the FlexO group interface to which h physical ports have been added; or the port switching indication information is used to indicate to: start counting from a currently sent OTUXn signal, and after i OTUXn signals are sent, remove h physical ports in a plurality of physical ports comprised in the FlexO group interface, and send a FlexO frame through the FlexO group interface in which the ports have been removed, wherein h and i are positive integers.

12. The method according to claim 1, wherein the sending the at least n FlexO frames through a FlexO group interface comprises:
sending each of the at least n FlexO frames through at least two physical ports in a plurality of physical ports comprised in the FlexO group interface; or sending at least two FlexO frames in the at least n FlexO frames through each of the plurality of physical ports comprised in the FlexO group interface.

13. The method according to claim 3, wherein the performing redundancy coding comprises performing coding using any one of a Reed-Solomon (RS) type erasure code, a low-density erasure code, an array code, a digital fountain code, a regenerating code based on network coding, and a local check code.

14. A service data processing method, comprising:
receiving m FlexO frames through a flexible optical transport network FlexO group interface, wherein the m FlexO frames are at least n FlexO frames sent by a transmit-end device or a part of the at least n FlexO frames, the at least n FlexO frames comprise r FlexO check frames and a plurality of FlexO data frames, the r FlexO check frames carry service check data, and the plurality of FlexO data frames carry service data; and
if it is detected, based on the m FlexO frames, that the at least n FlexO frames sent by the transmit-end device comprise k FlexO frames whose bit error rates are greater than a reference bit error rate, restoring the service data based on first service check data and first service data that are carried in a plurality of first FlexO frames in the m FlexO frames, wherein the plurality of first FlexO frames are FlexO frames whose bit error rates are not greater than the reference bit error rate, the first service data is a part of the service data;
wherein n and m are positive integers, m is smaller than or equal to n, r is a positive integer not greater than n−1, and k is a positive integer not greater than r.

15. The method according to claim 14, wherein the restoring the service data based on first service check data and first service data that are carried in a plurality of first FlexO frames in the m FlexO frames comprises:
performing demapping on each of the m FlexO frames to obtain m optical transport unit X (OTUX) frames that are in a one-to-one correspondence with the m FlexO frames, with X representing a pre-set data rate;
restoring OTUX frames corresponding to the k FlexO frames in the at least n FlexO frames based on the first service check data and the first service data that are carried in a plurality of first OTUX frames that are in the m OTUX frames and that are in a one-to-one correspondence with the plurality of first FlexO frames, wherein the k FlexO frames are FlexO frames that are in the at least n FlexO frames and whose bit error rates are greater than the reference bit error rate; and
restoring the service data based on the first service data carried in the plurality of first OTUX frames and second service data carried in the restored OTUX frames corresponding to the k FlexO frames.

16. The method according to claim 15, wherein each of the m OTUX frames comprises an OTUX overhead, and the OTUX overhead of each OTUX frame comprises a frame alignment (FA) byte and a multiplex structure identifier (MSI) overhead;
the restoring OTUX frames corresponding to the k FlexO frames in the at least n FlexO frames based on first service check data and first service data that are carried in a plurality of first OTUX frames that are in the m OTUX frames and that are in a one-to-one correspondence with the plurality of first FlexO frames comprises:
aligning the m OTUX frames based on the FA byte in the OTUX overhead of each of the m OTUX frames;
determining that an OTUX frame that is in the plurality of first OTUX frames and whose MSI overhead comprises frame indication information is an OTUX check frame, and determining that a remaining OTUX frame in the plurality of first OTUX frames is an OTUX data frame;
restoring OTUX overheads of the OTUX frames corresponding to the k FlexO frames based on information in an OTUX overhead of the OTUX check frame other than an FA byte and an MSI overhead, and information in an OTUX overhead of the OTUX data frame other than an FA byte and an MSI overhead;
restoring service data in the OTUX frames corresponding to the k FlexO frames based on the first service data carried in the OTUX data frame and the first service check data carried in the OTUX check frame; and
obtaining the OTUX frames corresponding to the k FlexO frames based on the restored OTUX overheads of the OTUX frames corresponding to the k FlexO frames and the service data in the OTUX frames corresponding to the k FlexO frames.

17. The method according to claim 14, wherein each of the m FlexO frames comprises an in-line monitoring indication code, and the in-line monitoring indication code is used to indicate whether a bit error rate of a corresponding FlexO frame is greater than the reference bit error rate: and the method further comprises:
determining, based on a plurality of FlexO frames that are received through a plurality of physical ports in the FlexO group interface before the m FlexO frames are received, a reference code of a FlexO frame in the plurality of FlexO frames received through each of the plurality of physical ports; and
determining, based on the reference code of the FlexO frame in the plurality of FlexO frames received through each of the plurality of physical ports and the in-line monitoring indication code carried in each of the m FlexO frames, whether the at least n FlexO frames comprise k FlexO frames whose bit error rates are greater than the reference bit error rate.

18. The method according to claim 15, wherein the method further comprises:
when an OTUX overhead of any one of the m OTUX frames comprises port switching indication information, based on the port switching indication information, starting counting from a currently received OTUXn signal, and after an $i^{th}$ OTUXn signal is received, receiving a FlexO frame sent through the FlexO group interface to which h physical ports have been added, or receiving a FlexO frame sent through the FlexO group interface in which h physical ports have been removed, wherein i and h are positive integers.

19. A service data processing device, wherein the service data processing device comprises a processor and a memory, wherein the memory is configured to store a program that supports the service data processing device to execute a service data processing method, and the memory is further configured to store data used to implement the service data processing method;

the service data processing method comprising:

generating an optical transport network (OTN) encapsulated signal, wherein the OTN encapsulated signal is used to carry service data, and the OTN encapsulated signal is a signal obtained by encapsulating the service data in an OTN data packet encapsulation format;

generating at least n FlexO frames, wherein the at least n FlexO frames are used to carry the OTN encapsulated signal, the at least n FlexO frames comprise r FlexO check frames and a plurality of FlexO data frames; the plurality of FlexO data frames carry the service data, and the r FlexO check frames carry service check data, wherein the service check data is used to restore the service data when bit error rates of k FlexO frames are greater than a reference bit error rate; and n is a positive integer larger than 1, k is a positive integer not greater than r, and r is a positive integer not greater than n−1;

sending the at least n FlexO frames through a flexible optical transport network (FlexO) group interface; and the processor is configured to execute the program stored in the memory to implement the service data processing method.

* * * * *

UNITED STATES PATENT AND TRADEMARK OFFICE
CERTIFICATE OF CORRECTION

PATENT NO. : 11,611,816 B2
APPLICATION NO. : 17/333177
DATED : March 21, 2023
INVENTOR(S) : Junling Xiang et al.

Page 1 of 1

It is certified that error appears in the above-identified patent and that said Letters Patent is hereby corrected as shown below:

In the Claims

In Column 25, Line 30, in Claim 1, delete "signa" and insert -- signal --.

Signed and Sealed this
Sixteenth Day of May, 2023

Katherine Kelly Vidal
*Director of the United States Patent and Trademark Office*